(12) United States Patent
McLendon

(10) Patent No.: US 8,867,335 B2
(45) Date of Patent: Oct. 21, 2014

(54) SYSTEM AND METHOD FOR FAULT ISOLATION IN A PACKET SWITCHING NETWORK

(75) Inventor: Jonathon C. McLendon, Raleigh, NC (US)

(73) Assignee: Paradyne Corporation, Largo, FL (US)

( * ) Notice: Subject to any disclaimer, the term of this patent is extended or adjusted under 35 U.S.C. 154(b) by 3232 days.

(21) Appl. No.: 10/435,873

(22) Filed: May 12, 2003

(65) Prior Publication Data

US 2004/0090918 A1 May 13, 2004

Related U.S. Application Data

(60) Provisional application No. 60/425,384, filed on Nov. 12, 2002.

(51) Int. Cl.
*H04J 3/14* (2006.01)
*H04L 12/54* (2013.01)

(52) U.S. Cl.
CPC ........................................ *H04L 12/56* (2013.01)
USPC ............ 370/218; 370/237; 370/242; 709/235

(58) Field of Classification Search
USPC .......................... 370/216–250, 254, 354, 252; 714/25–46, 4; 709/223, 234; 390/216, 390/217, 218, 232, 237, 241, 242, 244, 248, 390/250, 252, 254; 375/222
See application file for complete search history.

(56) References Cited

U.S. PATENT DOCUMENTS

| | | | | |
|---|---|---|---|---|
| 4,706,080 A | * | 11/1987 | Sincoskie ...................... | 370/401 |
| 6,253,146 B1 | * | 6/2001 | Hanson et al. ................ | 701/414 |
| 6,751,660 B1 | * | 6/2004 | Mansingh et al. ........... | 709/223 |
| 6,885,632 B1 | * | 4/2005 | Mattson ........................ | 370/216 |
| 6,973,034 B1 | * | 12/2005 | Natarajan et al. ............. | 370/232 |
| 7,085,225 B2 | * | 8/2006 | Schaller et al. ............... | 370/217 |
| 7,103,795 B1 | * | 9/2006 | Hansen .............................. | 714/4 |
| 7,289,456 B2 | * | 10/2007 | Gupta et al. .................. | 370/254 |
| 7,535,825 B1 | * | 5/2009 | Callon .......................... | 370/216 |
| 8,082,361 B2 | * | 12/2011 | Alexander et al. ............ | 709/235 |
| 2002/0131362 A1 | * | 9/2002 | Callon .......................... | 370/216 |
| 2002/0186682 A1 | * | 12/2002 | Kawano et al. ............... | 370/351 |
| 2005/0013259 A1 | * | 1/2005 | Papoushado et al. ......... | 370/254 |
| 2006/0098670 A1 | * | 5/2006 | Voit et al. ..................... | 370/401 |
| 2007/0195872 A1 | * | 8/2007 | Diaz ............................. | 375/222 |

OTHER PUBLICATIONS

Malgorzata Steinder, Adarshpal S. Sethi, "Non-Deterministic Diagnosis of End-to-End Service Failures in a Multi-Layer Communication System," Dept. of Computer and Information Sciences, University of Delaware, Newark,DE.

Dan Rubenstein, Jim Kurose, Don Towsley, "Detecting Shared Congestion of Flows Via End-to-End Measurement," IEEE Transactions on Networking, vol. XX, No. YY, 2002.

* cited by examiner

*Primary Examiner* — Andrew Lai
*Assistant Examiner* — Leon Andrews
(74) *Attorney, Agent, or Firm* — Thomas | Horstemeyer, LLP

(57) ABSTRACT

A system and method for fault isolation in a packet switching network, wherein a network element may be categorized as faulty when the network element is identified as a point-of-congestion in the network. One such system can be broadly summarized by a representative communication system that incorporates a fault isolating element to monitor multiple network elements. The fault isolating element includes components such as a database of data flow paths that exist in the plurality of network elements, a data gathering element that is configured to collect performance information related to one or more network elements, and an analyzer element that uses the performance information collected by the data gathering element to identify one or more network elements as points of congestion.

25 Claims, 7 Drawing Sheets

SYSTEM AND METHOD FOR FAULT ISOLATION IN A PACKET SWITCHING NETWORK

CROSS REFERENCE TO RELATED APPLICATIONS

This application claims the benefit of U.S. Provisional Patent Application Ser. No. 60/425,384, filed Nov. 12, 2002, which is incorporated herein by reference in its entirety.

FIELD OF THE INVENTION

The present invention generally relates to fault isolation in packet switching networks. More specifically, the invention relates to identifying network elements that are points of congestion in a packet switching network such as the Internet.

BACKGROUND OF THE INVENTION

Packet switching networks typically incorporate a parameter termed Quality of Service (QoS) to provide end-users with a guarantee of a certain degree of end-to-end connectivity coupled with data transport reliability. Data transport reliability encompasses various parameters such as minimum guaranteed bandwidth, minimum guaranteed transmission latency and a minimum guaranteed error rate. Unfortunately, providing a customer with a QoS guarantee often turns out to be merely an estimate and often fails to accurately predict a desirable standard of performance. This failure occurs, in large part, due to the unpredictable nature of the volume of data packets carried over a packet network and the network's vulnerability to congestion.

While equipment failure is one cause of congestion, a second cause arises out of the cost-driven emphasis on over-subscription. Over-subscription exists when a service provider offers service to more customers than the network can handle, such service being offered under the assumption that not all customers will concurrently access the network.

When a first communication device such as, for example, a switch, a router, a server, or a computer, is connected to a second communication device, which also may be a switch, a router, a server, or a computer, to form one or more connections of a communications network, the two communication devices are referred to as network elements of the communications network. When a network element (NE) suffers congestion it is labeled as a point-of-congestion (POC) in the network.

While eliminating such a POC would significantly improve network transmission efficiency, identifying one or more NEs that are POCs proves to be a challenging task due to the lack of effective prior-art network-oriented fault isolation systems. Existing fault isolation systems are largely NE-oriented rather than network-oriented, and consequently provide fault isolation information at an NE level rather than at a network level.

Existing NE-oriented fault isolation systems and congestion control mechanisms are incorporated into various architectures such as, for example, simple network management protocol (SNMP), connection admission control (CAC), asynchronous transfer mode (ATM), and transmission control protocol (TCP).

NE-oriented fault isolation systems typically process data packets inside an NE to detect and measure parameters that indicate faults and/or congestion. These parameters include, for example, an excessive bit error rate (BER), an erroneous cyclic redundancy check (CRC), and the number of missing data packets. An ATM switch, for example, may process multiple incoming data packet streams by analyzing the cell header contents carried by ATM frames to identify one or more streams having excessive errors. Under this congestion analysis, the ATM switch may also be designed to identify which particular data packet stream is contributing to congestion or excessive errors. The ability to identify the offending data packet stream however, does not lead to identifying the network element causing the congestion, because the ATM switch generally does not have/use information related to the network architecture to identify the network element.

Existing network-oriented fault isolation systems generally utilize monitoring and detection software that is installed in multiple NEs across the network. For example, SNMP uses a SNMP manager software and a Management Information Base (MIB) that is located in a manager device to interact with SNMP agent software installed in one or more managed objects. Typically, a SNMP manager device processes a high-level transmission protocol, such as internet protocol (IP), to establish performance statistics of a managed device. The manager device does not generally collect performance statistics that involve processing other protocols that may be used on data packets that are carried over this high-level transmission protocol.

To illustrate, if a user were using a voice-over-IP (VoIP) protocol, an SNMP system would be unable to provide error information that is specifically related to VoIP. In this scenario, a service provider offering VoIP services to this user will have difficulty in guaranteeing a specific QoS. Furthermore, the service provider may not own the NEs in the network used to provide this service, and consequently, may not be authorized to query such NEs and obtain performance parameters that will enable the service provider to establish a level of QoS that can be offered.

It is therefore desirable to provide a network-oriented fault isolation system that can be used to isolate a fault-contributing NE in a packet switching communication network. It is also preferable that such a system utilize existing transmission formats and fault isolation parameters without requiring installation of customized software in multiple NEs of the network.

SUMMARY OF THE INVENTION

The present invention provides a system and method for fault isolation in a packet switching network. In this regard, one such system can be broadly summarized by a representative communication system that incorporates a fault isolating element communicatively coupled to a plurality of network elements. The fault isolating element comprises a database of data flow paths that exist in the plurality of network elements, a data gathering element that is communicatively coupled to a first network element in the plurality of network elements, the data gathering element configured to collect performance information related to the first network element, and an analyzer element that uses the performance information collected by the data gathering element to identify the first network element as a point-of-congestion.

Another embodiment can be described as a method for fault isolation including providing a database of data flow paths that exist in a network comprising a plurality of network elements, and using the database of data flow paths to generate a list of network elements that are potential points-of-congestion. The method further includes providing an error threshold value related to a network element in the list of network elements, collecting error information related to the network element, and analyzing the collected error information and the error threshold value to identify the network element as a point of congestion.

Other systems, methods, features, and advantages of the present invention will be or become apparent to one with skill in the art upon examination of the following drawings and detailed description. It is intended that all such additional systems, methods, features, and advantages be included within this description and be within the scope of the present invention.

DESCRIPTION OF THE DRAWINGS

The invention can be better understood with reference to the following drawings. The components in the drawings are not necessarily drawn to scale, emphasis instead being placed upon clearly illustrating the principles of the invention. Moreover, in the drawings, like reference numerals designate corresponding parts throughout the several views.

DETAILED DESCRIPTION OF THE PREFERRED EMBODIMENT

Figure 1:
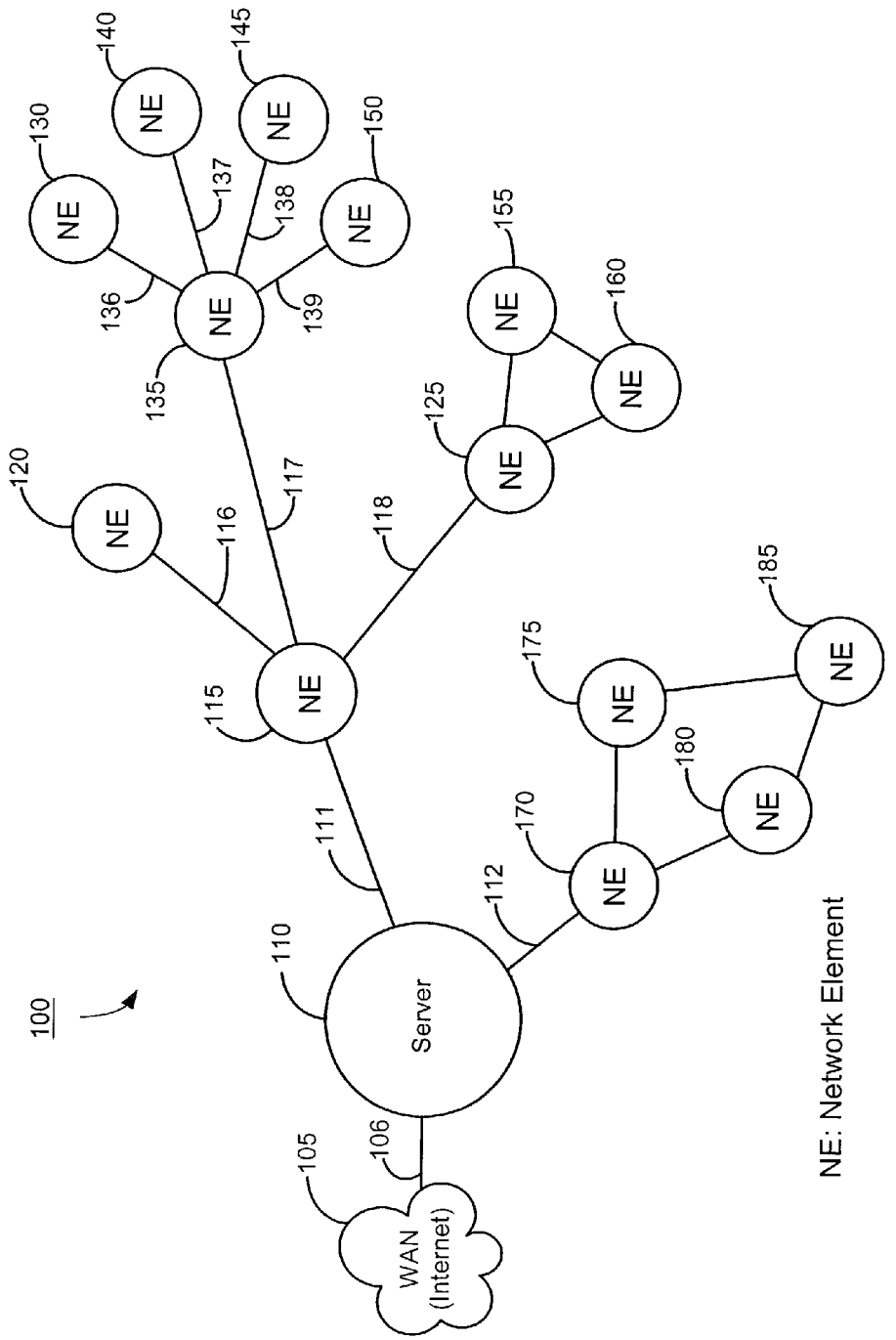
FIG. 1 is a connection diagram depicting a prior art network including multiple network elements (NEs) connected to a server that provides connectivity for the multiple NEs into a wide area packet switching communication network, such as the Internet.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

FIG. 1 is a connection diagram depicting a prior art network 100 that includes multiple network elements connected to a server 10 in a network topology that may be referred to as a star network. Server 110 is typically referred to as a hub network element of this star network, provides connectivity for the NEs into the wide area packet switching communication network 105. Network 105 may be a wide area network (WAN) such as the Internet. Server 110 may be a gateway device, such as a PC, a computer workstation, or a telecommunications device, that provides Internet connectivity to the multiple NEs. Each NE can typically be a PC, which has an individually recognizable IP addresses that the server 110 uses to route data packets to and from the network 105. It should be noted that, while server 110 may be cognizant of the IP addresses of all active NEs at any instant in time, the server 110 does not necessarily have a 'map' describing the overall network in terms of the interconnection among the multiple NEs.

For example, while server 110 may be aware of the IP addresses of NE 130, NE 140, NE 145, and NE 150, typically server 110 will be unaware of the architecture linking these NEs to each other or any other NE. While FIG. 1 shows these four NEs connected to NE 135 in a star topology, they may be alternatively connected to NE 135 in a daisy-chain, a bus, or a ring topology. Bus and ring topologies are well-known architectures for implementing local area networks (LANs), for example, using Ethernet. Consequently, if, for example, server 110 detects excessive errors in data packets originating from NE 140, as identifiable by the IP address of NE 140, server 110 does not have the ability to determine whether the cause of the excessive errors lies in NE 140 or in NE 135, which is an additional NE in the path between NE 140 and server 110.

Furthermore, if NE 140 is connected to NE 130, NE 145, and NE 150 in a daisy-chain connection, the order of connections inside the daisy-chain may determine how one NE in this daisy-chain would affect the other NEs in the chain. Under this scenario, while a single NE, such as NE 140, may be the fault-contributing element, server 110 may detect excessive errors in the data packets it receives from NE 115, and erroneously conclude that multiple NEs are contributing to this fault condition.

Figure 2:
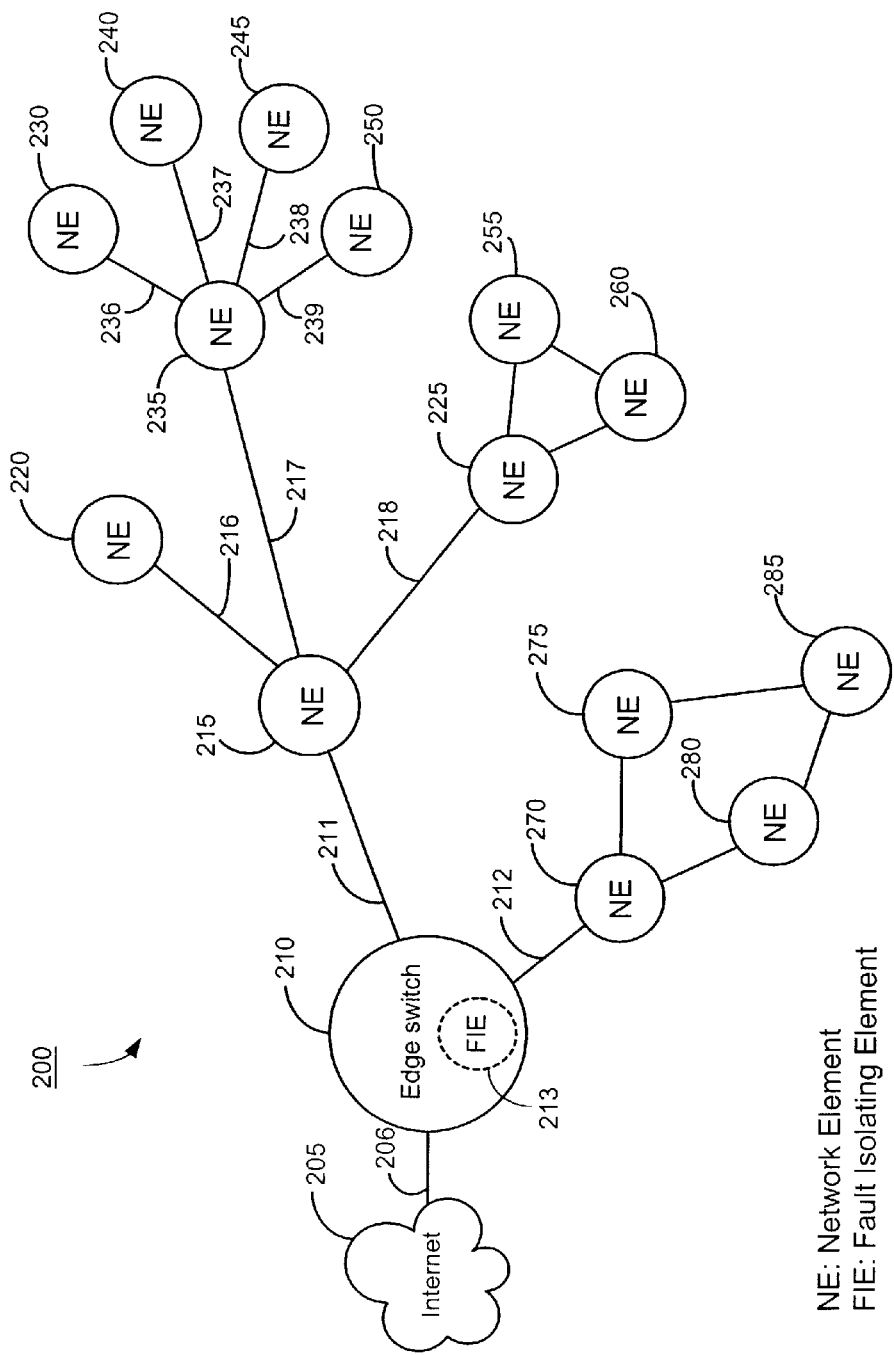
FIG. 2 is a connection diagram depicting a network according to an embodiment of the invention, where multiple network elements (NEs) are connected to an edge switch that incorporates an exemplary fault isolating element (FIE). The edge switch provides connectivity for the multiple NEs into the Internet.

FIG. 2 is a connection diagram illustrating a network 200 in which multiple network elements are connected to an edge switch 210. Edge switch 210 is a network element that incorporates embodiments of the invention in an exemplary fault isolating element (FIE) 213. Edge switch 210 is coupled to NE 215 via link 211, and to NE 270 via link 212. Network elements 215 and 270, which are termed downstream elements of edge switch 210, are coupled to multiple network elements via multiple links as shown in FIG. 2. In a second example of a downstream element, NEs 230, 240, 245, and 250 are termed downstream elements of NE 235. Conversely, NE 235 may be referred to as an upstream element that is directly connected to NEs 230, 240, 245, and 250; while edge switch 210 may be referred to as an upstream element that is directly connected to NE 215 and indirectly connected to NE 235.

When data packets are transported from any network element in a direction towards edge switch 210, the data flow is referred to as an upstream flow, while a data flow in the direction away from edge switch 210 toward the NEs is referred to as a downstream flow. A port located on a network element, which accepts incoming data packets, is referred to as an ingress port, while a port that transmits data packets is referred to as an egress port. To further explain these terms using an example of an upstream data flow, NE 215 incorporates three ingress ports (not shown) and one egress port (not shown); while for a downstream flow NE 215 has one ingress port (not shown) and three egress ports (not shown).

The transportation of data packets across the network of FIG. 2 may be illustrated with an example IP data packet originating from NE 230 and traveling toward the Internet 205. NE 230 may be a PC that an end-user operates to access the Internet. An IP data packet from NE 230 travels through link 236 to an upstream ingress port of NE 235. Three other upstream ingress ports of NE 235 are connected to network elements 240, 245, and 250. NE 235 uses a data admission protocol, such as CAC, to determine if the IP data packet from NE 230 can be transmitted into an upstream egress port of NE 235 that couples NE 235 via link 217 to NE 215.

Assuming that NE 235 is limited in capacity to processing only one IP data packet at any particular instance in time, and the other three NEs are idle, NE 235 accepts the incoming IP data packet for transmission to NE 215. During the processing and transmission of the data packet, NE 235 will be unable to accept any data packets from the other connected NEs. This situation causes NE 235 to become a point of congestion (POC) whenever data packets are concurrently received by more than one of the four NEs feeding into NE 235. In this particular example, NE 235 has been described as having a transmitting limitation of one IP data packet. In more general terms, NE 235 may be described as having a limitation of one data flow at a time.

A "data flow" may be defined in several ways using processing limitation parameters and transmission limitation parameters. Processing limitation parameters include conditions such as limited buffer capacity and excessive transmission latency. Transmission limitation parameters include conditions such as insufficient data transmission rate and insufficient transmission bandwidth. The term 'data flow' is intended to quantify the data transmission capacity of an NE, and to further define a quantifiable parameter to identify an NE as a POC. A POC is typically undesirable in a network, and may be termed as one of several faults. Such a fault should be identified, isolated and corrected to optimize data flow across the network.

Referring back to FIG. 2, NE 215 receives an IP data packet from link 217, and, subject to its own processing limitation parameters and transmission limitation parameters, transmits the IP data packet into its upstream egress port, which is connected by link 211 to edge switch 210. The other two upstream ingress ports of the NE 215 are coupled to network elements 220 and 225. If NE 215 supports less than three data flows concurrently, in a manner similar to that explained earlier with reference to NE 235, NE 215 will also be designated as a potential POC.

Edge switch 210 receives the IP data packet on one of its two upstream ingress ports (not shown) and transmits the IP data packet to the Internet 205, via link 206. FIE 213 that is incorporated inside edge switch 210 identifies POCs in network 200 by using information contained inside data packets transmitted by one or more NEs. For example, FIE 213 may collect bit error statistics contained in a data packet transmitted from NE 215 to determine whether NE 215 is a POC. Alternatively, it may collect similar statistics from data packets that originate from NEs 235 and 225, to identify NE 215 as a POC. The information contained inside these data packets may typically include industry-standard identifiers such as ATM header information, synchronous optical network (SONET) header information, and IP overhead information.

One exemplary method of operation of FIE 213 to identify a POC may include the generation of a database of data flows that exist between and among the various NEs of network 200. Such a database may include information to indicate that NE 215 has three connected NEs, NE 235 has four connected NEs, and NE 220 has no connected NEs. This information may be used to eliminate NE 220 as a potential POC, while the other two NEs may require further analysis to classify them as POCs at any subsequent instant in time. Such analysis may be illustrated by the following examples wherein data flows of the three NEs are examined in more detail.

In a first example, FIE 213 collects error statistics by accessing information contained in the data packets received by edge switch 210, which indicate that NE 215 has recorded 10 errors in 1000 packets over a certain period of time, while NE 235 has recorded 8 errors in 40 packets and NE 225 has recorded 2 errors in 60 packets over the same period of time. The error rates for the three NEs over this period of time will therefore, equal 0.01, 0.2, and 0.03 respectively. FIE 213 may also determine that NE 215 has processed 1000 packets, of which NE 235 has contributed 40 packets and NE 225 has contributed 60 packets. Using its database of data flows, FIE 213 can determine that the remaining 900 packets were contributed by NE 220 which is also connected to NE 215.

Upon analyzing the observed error rates from the three NEs, FIE 213 can determine that NE 235 has an error rate that is substantially higher than that of NEs 215 and 225, thereby concluding that NE 235 may constitute a potential POC.

In a second example, FIE 213 collects error statistics that indicate that NE 215 has recorded 10 errors in 100 packets, NE 235 has recorded 10 errors in 40 packets, and NE 225 has recorded 0 errors in 60 packets, the analysis concludes that all the 10 errors in NE 215 are attributable to NE 235 as will be described below.

The first example analyzes the performance of the three NEs in a relatively absolute manner by calculating their individual error rates and grading their performances accordingly. The second example analyzes the performance of the three NEs in a relational manner by comparing the performance of NE 215 with reference to NE 235 and NE 225. In a general definition, the first approach may be defined as an analysis of a performance metric of any one NE in absolute terms, while the second approach may be defined as an analysis of the performance metric of one particular NE with reference to the performance metrics of contributory NEs that are connected to this particular NE. Several other analytical processes may be used to analyze network performance and identify POCs.

Both approaches may utilize templates, in the form of historical data, such as reference performance metrics that have been accumulated over a certain period of time, to analyze subsequent performance of one or more NEs. For example, a reference performance metric of NE 215 may be generated in FIE 213 by collecting error statistics contained in a data packet carried from NE 215 via link 211 into FIE 213 over a first period of time, to create a reference metric for NE 215. Similarly, FIE 213 may also generate a reference metric for NE 235 by collecting error statistics contained in a data packet carried from NE 235 via link 217 into NE 215, and subsequently contained in another data packet carried over link 211 into FIE 213.

It should be pointed out that while FIG. 2 illustrates the use of an edge switch 210 for providing Internet connectivity to multiple NEs, it will be understood that this is done merely for example purposes, and many other devices may be utilized for providing Internet connectivity. Such devices include a gateway, a server, a packet switch, or any other device that processes data packets in a packet switching communication network. The exemplary fault isolating element (FIE) 213 may be incorporated into any of these devices that are part of a packet switching communications network.

It should also be understood that Internet 205 is one example of a packet switching network, and can be replaced by several other types of communication networks such as for example, corporate WANs and LANs.

Figure 3:
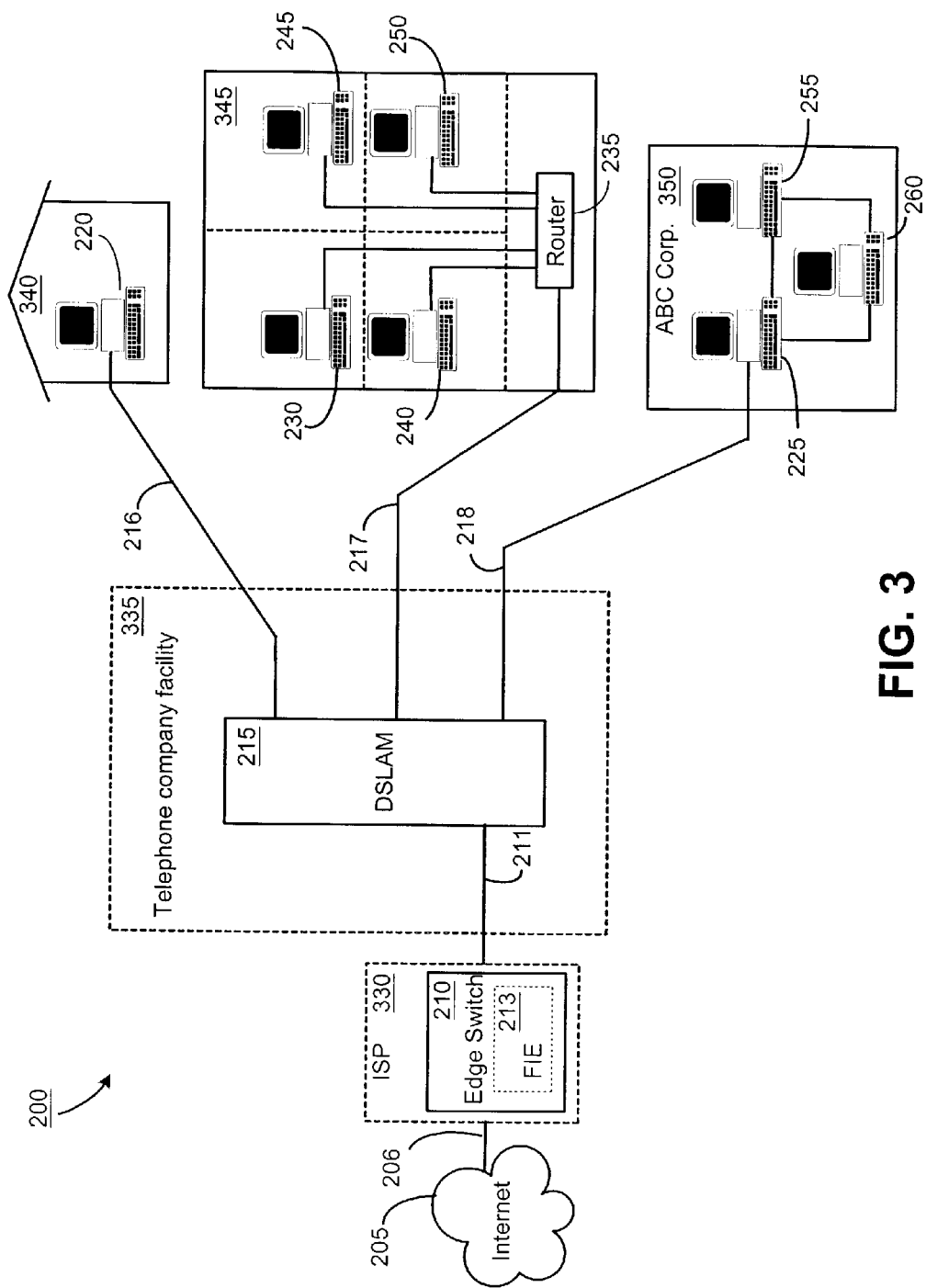
FIG. 3 is a block diagram illustrating a telephone company facility including a central office (CO) for providing data communication services to multiple customers through a digital subscriber loop access multiplexer (DSLAM).

FIG. 3 is a block diagram illustrating telephone company facility 335, such as a central office (CO), providing data communication services to multiple customers through a digital subscriber loop access multiplexer (DSLAM) 215, which is one example of the NE 215 shown in FIG. 2. Attention is drawn to the like reference numerals designating the devices in FIG. 3 to their equivalent network element labels in FIG. 2. For the sake of brevity, certain elements of FIG. 2 have been omitted in FIG. 3, as their usage in FIG. 3 will be readily apparent to persons of ordinary skill in the art.

DSLAM 215 is coupled to the edge switch 210 located in an Internet service provider's facility designated as ISP 330. The ISP 330 can be either external or internal to telephone company facility 335. Edge switch 210 is coupled via communication link 211 to DSLAM 215. DSLAM 215 is a network element that provides communication services and Internet connectivity to multiple customers via communication links that couple DSLAM 215 to network elements located inside customer locations 340, 345 and 350. As explained with reference to NE 215 of FIG. 2, DSLAM 215 may constitute a POC.

Customer location 340 is a single-family residence housing a network element illustrated as a personal computer (PC) 220 that is connected by link 216 to the DSLAM 215. PC 220 is typically used for home computing and for Internet access by family members.

Customer location 345 is, for example, a multi-tenant housing unit that houses a router 235 to provide Internet access to four tenants sharing a single link 217 to the DSLAM 215.

Customer location 350 is a small office that houses a local area network, connecting three PCs 225, 255, and 260, where PC 225 is configured as a server that is connected to DSLAM 215 via link 218.

PC 220 at customer location 340 is not a potential POC because it is an independent element with no other NEs connected to it. In this configuration, PC 220 acts as a single data terminating element, rather than as a switching element for multiple NEs. PC 220 generates and transmits data packets towards DSLAM 215 as well as receives and terminates data packets from DSLAM 215. PC 220 does not receive data packets from any source other than DSLAM 215. Consequently PC 220 does not suffer from potential congestion that may arise when multiple PCs transmit data simultaneously into a single PC.

Similar to PC 220 inside customer location 340, PCs 230, 240, 245, and 250 do not constitute potential POCs because each of these PCs do not have other PCs transmitting data packets to them. On the other hand, router 235 may be classified as a potential POC because of the possibility of blocking that may be created when PCs 230, 240, 245, and 250 simultaneously transmit data upstream. For example, if PC 230 was actively transmitting a continuous stream of data packets into router 235, PC 240 may be blocked from accessing link 217. This can occur if router 235 has a bottleneck that prevents it from handling two concurrent data flows.

PCs 225, 255, and 260 are connected to each other in a ring configuration network. Any of these three PCs may be potential POCs depending upon the methods used to route data packets between the three PCs, and to interface data packets into link 218.

With reference to FIG. 3, it will be understood that, while edge switch 210 has been designated as incorporating an exemplary FIE 213, in alternative embodiments, several other elements including DSLAM 215, may incorporate FIE functionality.

Figure 4:
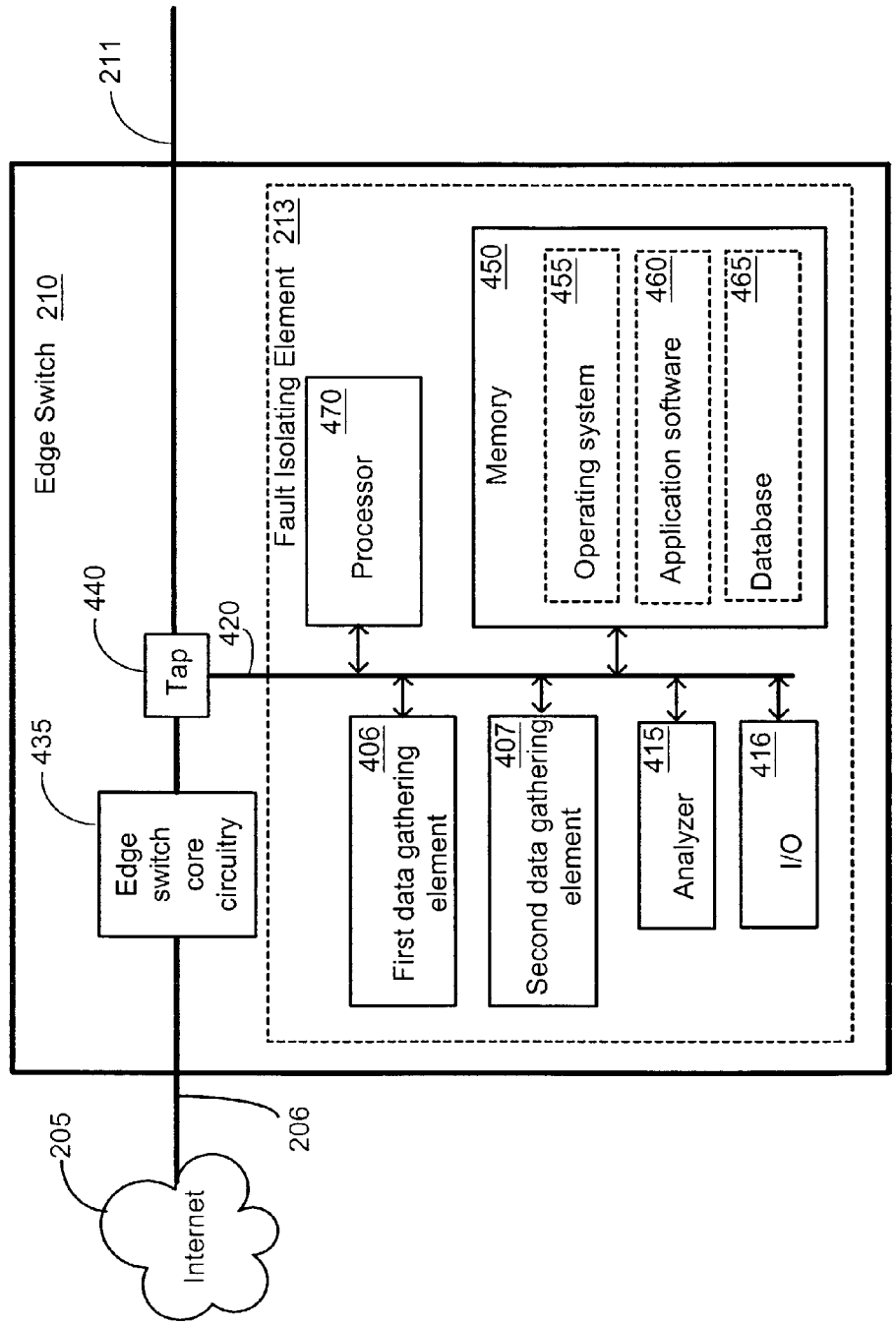
FIG. 4 is a block diagram illustrating the components of the exemplary fault isolating element (FIE) that is incorporated inside the edge switch of FIGS. 2 and 3.

FIG. 4 is a block diagram illustrating exemplary components used to implement FIE 213 inside edge switch 210. Link 211, which links DSLAM 215 (FIG. 2) to edge switch 210, will connect into the core circuitry 435 of the edge switch. The core circuitry 435 provides connectivity into the Internet 205 via link 206. The edge switch 210 also includes a local interface 420, which may typically be implemented as a tapped connection that uses tap 440 to access the data streams being carried over link 211.

Generally, in terms of hardware architecture, as shown in FIG. 4, FIE 213 includes a processor 470, memory 450, a first data gathering element 406, a second data gathering element 407, an analyzer 415 and one or more input and/or output (I/O) devices 416 (or peripherals) that are communicatively coupled via the local interface 420. The local interface 420 can be, for example but not limited to, one or more buses or other wired or wireless connections, as is known in the art. The local interface 420 may have additional elements, which are omitted for simplicity, such as controllers, buffers (caches), drivers, repeaters, and receivers, to enable communications. Further, the local interface 420 may include address, control, and/or data connections to enable appropriate communications among the aforementioned components.

The processor 470 is a hardware device for executing software, particularly that stored in memory 450. The processor 470 can be any custom made or commercially available processor, a central processing unit (CPU), an auxiliary processor among several processors associated with the edge switch 210, a semiconductor based microprocessor (in the form of a microchip or chip set), a macroprocessor, or generally any device for executing software instructions.

The memory 450 can include any one or combination of volatile memory elements (e.g., random access memory (RAM, such as DRAM, SRAM, SDRAM, etc.)) and nonvolatile memory elements (e g, ROM, hard drive, tape, CDROM, etc.). Moreover, the memory 450 may incorporate electronic, magnetic, optical, and/or other types of storage media. Note that the memory 450 can have a distributed architecture, where various components are situated remote from one another, but can be accessed by the processor 470.

The software in memory 450 may include one or more separate programs, each of which comprises an ordered listing of executable instructions for implementing logical functions. In the example of FIG. 4, the software in the memory 450 includes the application software 460 in accordance with the present invention, a database 465, and a suitable operating system (O/S) 455. The operating system 455 essentially controls the execution of other computer programs, such as application software 460, and provides scheduling, input-output control, file and data management, memory management, and communication control and related services.

The application software 460 is a source program, executable program (object code), script, or any other entity comprising a set of instructions to be performed. When a source program, then the program needs to be translated via a compiler, assembler, interpreter, or the like, which may or may not be included within the memory 450, so as to operate properly in connection with the O/S 455. Furthermore, the application software 460 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The data gathering elements 406 and 407 may be implemented as a combination of hardware, software, and firmware components such as hardware demultiplexers, hardware memory registers, hardware decoders, hardware integrators, software integrators, and software and/or firmware programs for data manipulation and processing.

The two data gathering elements may be integrated into one common functional block with shared functionality. For example, a register that is used in the first data gathering element during a certain period of time, may be used in the second data gathering element during a subsequent period of time. Local interface 420 provides the data gathered in elements 406 and 407, to several other blocks inside FIE 213.

Database 465 may be implemented using one or more data-structure classes or families. Such families include a flat database, a relational database, a hierarchic database, a network database, and a semantic database. The one or more data-structure classes may be implemented using one or more hardware and/or one or more software elements. Hardware elements include for example but not limited to, memory circuits and/or registers; while software elements may comprise for example, firmware code.

In the exemplary embodiment illustrated in FIG. 4, database 465 comprises a software element that is contained in a memory 450. Database 465 may be manually configured by an operator using I/O device 416 that is coupled to memory 450 through the local interface 420. Alternatively, database 465 may be configured by enabling FIE 213 to access information contained in link 211 that communicatively couples FIE 213 to one or more NEs in network 200. This information may be contained inside one or more data packets that are originated by one or more NEs in network 200.

Analyzer 415 accesses database 465 via local interface 420 and implements the analysis part of the fault isolating functions. Analyzer 415 may also be implemented in hardware and/or software. Database 465 is used to store information, such as a list of NEs, and data gathering element 406 is used to collect information, such as the list of NEs. The functionality of database 465 and data gathering elements 406 and 407 will be explained in further detail with reference to FIG. 5.

The I/O devices 416 may include input devices, for example but not limited to, a keyboard or a mouse. Furthermore, the I/O devices 416 may also include output devices, for example but not limited to, a printer, display, etc. The I/O devices 416 may further include devices that communicate both inputs and outputs, for instance but not limited to, a modulator/demodulator (modem for accessing another device, system, or network), a radio frequency (RF) or other transceiver, a telephonic interface, a bridge, a router, etc.

When FIE 213 is in operation, the processor 470 is configured to execute software stored within the memory 450, to communicate data to and from the memory 450, and to generally control operations of the FIE 213 pursuant to the software. The application software 460 and the O/S 455, in whole or in part, but typically the latter, are read by the processor 470 and then executed.

In an embodiment where the FIE 213 is implemented in hardware, the FIE 213 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 5:
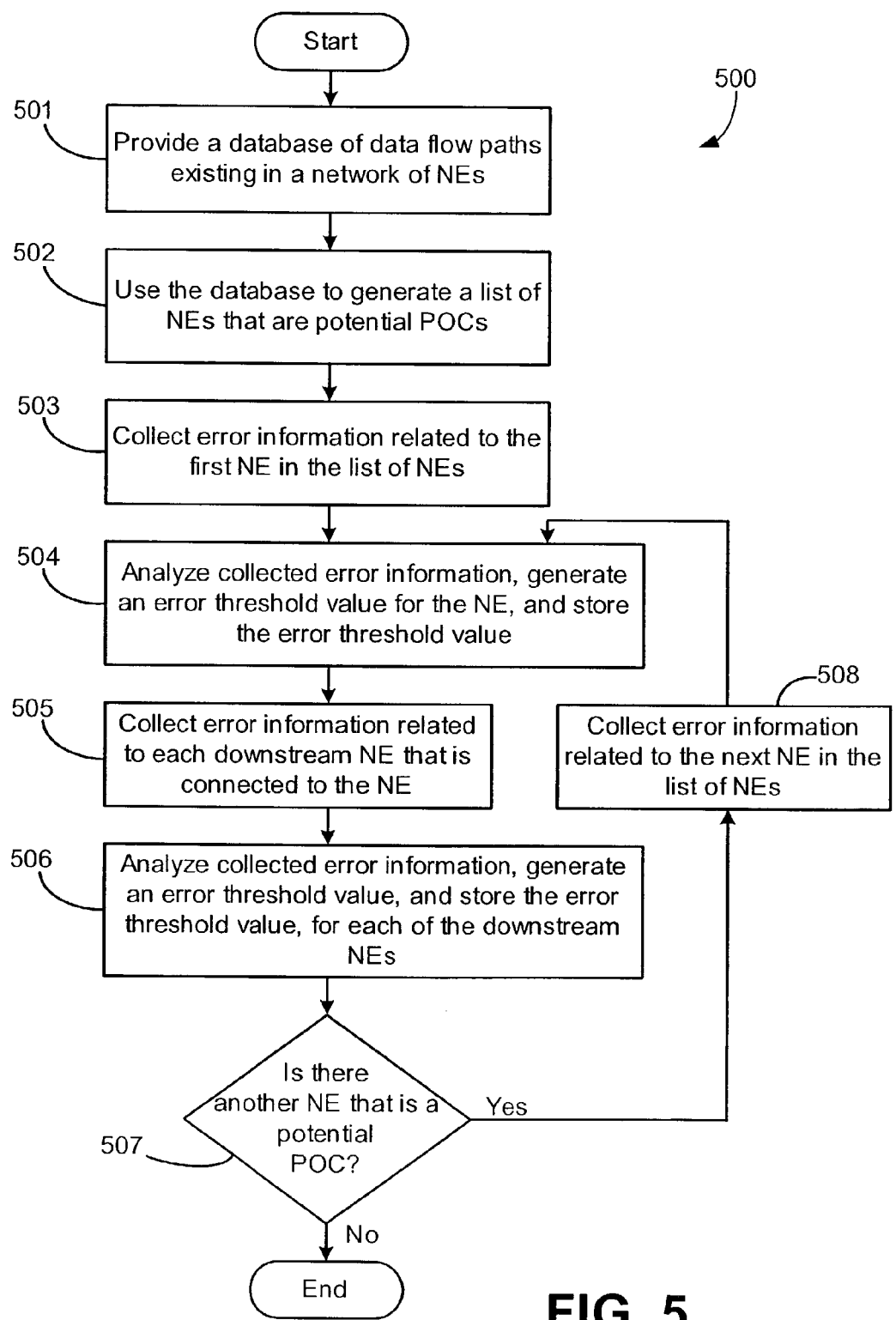
FIG. 5 is a flowchart illustrating an exemplary method for storing error threshold values for various NEs that constitute potential points of congestion, the NEs being configured in a network such as the network of FIG. 2.

FIG. 5 is a flowchart 500 illustrating an exemplary method for storing error threshold values for various NEs that constitute potential POCs, the NEs being configured in a network such as the network of FIG. 2. FIG. 5 will be explained with reference to FIGS. 2, 3 and 4. In block 501, a data base, such as database 465 of FIG. 4, is provided. Information relating to data flow paths in the network 200 of FIG. 2 is stored, either manually or automatically, in database 465. Manually entering information into the database 465 includes various methods such as, for example, an operator using I/O 416 of FIG. 4. Automatic entry of information into the database 465 may, for example, be provided by using processor 470 to obtain network information such as bit errors via link 211 or via other communication links that are not shown in FIG. 4.

Information stored and subsequently provided by database 465 may include NE inter-connectivity data. For example, database 465 may be used by processor 470 to store and obtain information showing that NE 235 is directly connected to four downstream NEs, while NE 270 is directly connected to two downstream NEs 275 and 280. The database 465 may also be used by processor 470 to store and obtain information about alternative flow paths, such as the two alternative flow paths between NE 285 and NE 270, where a first flow path connects NE 285 to NE 270 via NE 275 and a second flow path connects NE 285 to NE 270 via NE 280. Such information may be used to provide alternative routing during faults, or to alleviate traffic congestion on individual NEs during high congestion conditions. For example, if NE 280 becomes faulty and produces excessive errors, processor 470 may identify NE 280 as a POC, and facilitate re-routing of traffic that was being handled by NE 280 to NE 275 instead. The re-routed traffic now travels from NE 285 to NE 270 via NE 275.

Block 502 illustrates the use of processor 470 and analyzer 415 to analyze the information stored in database 465 to identify one or more NEs that can become POCs when network 200 is carrying data traffic. These NEs are then classified as potential POCs in network 200, and the information regarding such potential POCs may be then stored in memory 450. This information may comprise a list of NEs that are potential POCs. One example of the process of identifying a potential POC, involves analyzing the network data flow paths to conclude that NE 235 may be a potential POC because it is connected to four downstream NEs that can transmit data packets simultaneously, thereby leading to congestion under certain conditions.

In block 503, error information related to the first NE in the list of NEs stored in memory 450 is collected. This collection process will typically be carried out by FIE 213 using processor 470, first data gathering element 406, link 211, and memory 450. Error information may comprise various parameters such as bit error rates, dropped packet count, and number of packets retransmitted. In block 504, the error information is analyzed in analyzer 415 using various parameters, such as acceptable error loss ratios, the use of retransmission algorithms, and service level agreements, to generate an error threshold value for this NE. The error threshold value may be described as a weight that is proportional to the probability of the NE that is a potential POC turning into a confirmed POC when carrying normal data traffic.

Once the error threshold value for a NE has been determined, the error threshold values for any downstream NEs that are connected to this NE have to be determined, as shown in blocks 505 and 506. It will be understood that this determination is done to allow later analysis of the error threshold value of the NE together with error threshold values of the downstream NEs to identify if the subject NE is the main contributor of congestion, or whether one or more downstream NEs that are connected to the subject NE are the contributors of the congestion. The error threshold values attributed to each downstream NE may be described as a weight that is proportional to the probability of the downstream NE becoming a POC when carrying normal data traffic.

Block 507 is implemented to determine the existence of another NE that is a potential POC. This determination is carried out by examining the list of NEs that are potential POCs. If such an NE exists, block 508 is implemented to collect error information relayed to the next NE in the database 465. The process then returns to block 504.

Figure 6A:
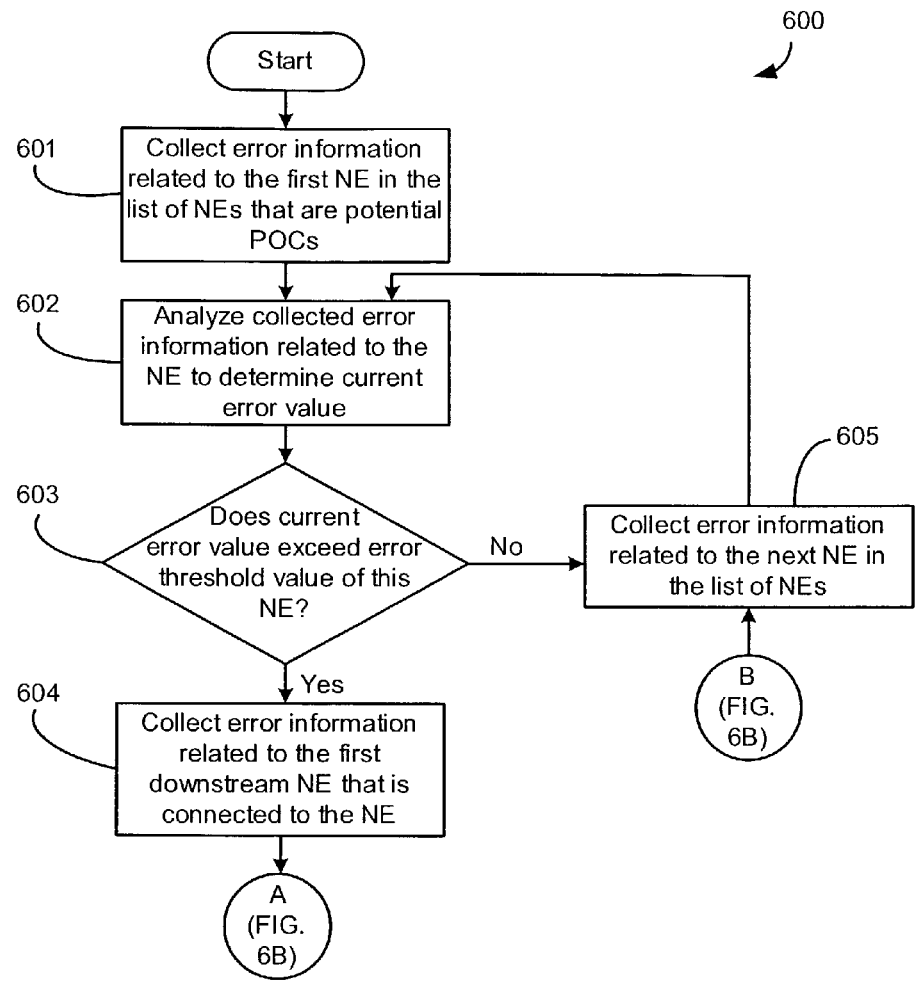
FIGS. 6A and 6B are flow charts collectively illustrating an exemplary method for collecting error information from various NEs and analyzing the error information using the error threshold values obtained using the steps of FIG. 5, to identify one or more NEs that are points of congestion.
Figure 6B:
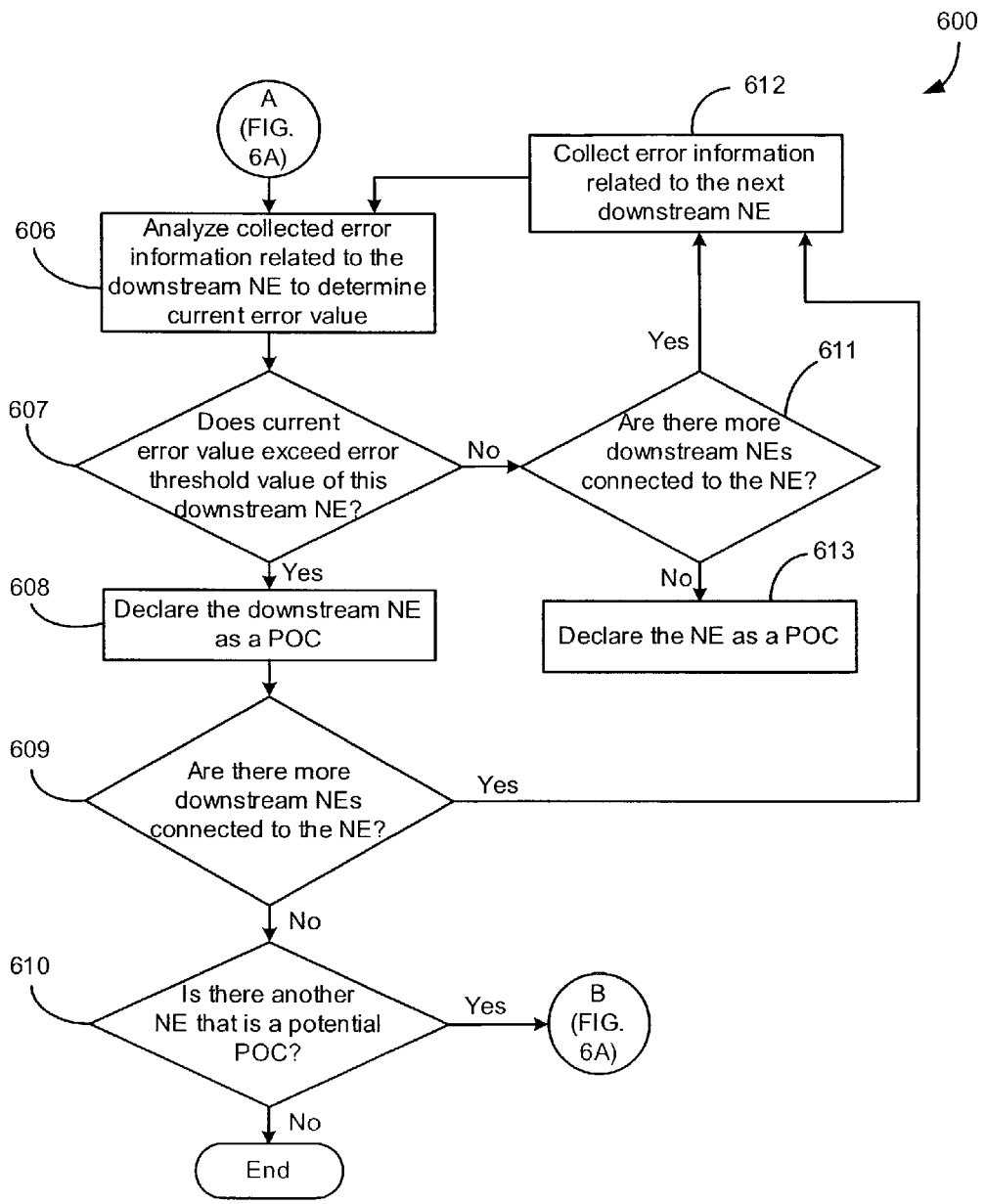

FIGS. 6A and 6B are flow charts collectively illustrating an exemplary method for collecting error information from various NEs and analyzing the error information using the error threshold values obtained using the steps of FIG. 5, to identify one or more NEs that are POCs.

In block 601, collection of error information related to the first NE in the list of NEs that are potential POCs is carried out. The list of NEs that are potential POCs is stored in database 465. The collection of error information may be carried out periodically or intermittently depending on the network operator's needs, and such collection may be carried out by FIE 213 using processor 470, second data gathering element 407, link 211, and memory 450.

The collected error information is analyzed, as shown in block 602, to determine a current error value for the subject NE. This analysis may comprise, for example, calculating the error rate based on the number of errors and the period over which these errors were accumulated, or calculating a normalized error value that can be compared against a normalized error value of another NE. In block 603, the current error value is then compared against the error threshold value for the subject NE. If the current error value does not exceed the error threshold value, block 603 is followed by block 605, which shows collection of error information related to the next NE in the list of NEs that are potential POCs.

If the current error value exceeds the error threshold value in block 603, block 604 follows block 603. In block 604, error information related to the first downstream NE that is connected to the NE of block 602 is collected. The collected error information is analyzed in block 606, followed by processing in block 607 to determine if the current error value exceeds the error threshold value of this particular downstream NE. If the current threshold value does not exceed the error threshold value, any further downstream NEs that are connected to the NE are processed as shown in blocks 611, 612, 606, and 607.

If no further downstream NEs are connected to the subject NE, it will be understood that the source of the POC will be the subject NE and not the downstream NE. Therefore, as shown in block 613, the subject NE is declared to be the POC. Alternatively, as described by block 607, if the error value of the downstream NE exceeds the error threshold value, the downstream NE is declared as the POC (block 608).

In block 609, it is determined whether any additional NEs are connected to the subject NE. If an additional NE is coupled to the subject NE, then, in block 612, error information related to this additional NE is collected. Block 612 is followed by implementing block 606 and subsequent blocks.

If it is determined in block 609 that no further NEs are coupled to the subject NE, in block 610 it is determined whether another NE that is a potential POC exists. This determination is carried out by examining the list of potential POCs stored in database 465. If such an NE exists, error information related to this NE is collected, as illustrated by block 605. Upon collection of the error information, block 602 and subsequent blocks are implemented to determine if the new NE is a POC.

If it is determined in block 610 that there are no further NEs that are potential POCs, the flowchart of FIGS. 6A and 6B are terminated or alternatively, may be re-implemented at a suitable time.

The above-described embodiments of the present invention are merely set forth for a clear understanding of the principles of the invention. Many variations and modifications may be made without departing substantially from the invention. All such modifications and variations are included herein within the scope of this disclosure and the present invention and protected by the following claims.

The invention claimed is:

1. A communication system comprising:
   a network comprising a plurality of network elements; and
   a fault isolating element communicatively coupled to the plurality of network elements, the fault isolating element comprising a database of data flow paths between ones of the plurality of network elements, the fault isolating element configured to identify a first network element in the plurality of network elements as a point-of-congestion based at least in part on the database of data flow paths, and to ignore, when identifying the first network element as the point-of-congestion, any independent network element in the plurality of network elements, where the independent network element is a single data terminating network element connected to a single network element with no other network element in the plurality of network elements connected to it.

2. The system of claim 1, wherein the fault isolating element further comprises:
   a data gathering element that is communicatively coupled to the first network element in the plurality of network elements, the data gathering element configured to collect performance information related to the first network element; and
   an analyzer element that uses the performance information collected by the data gathering element to identify the first network element as a point-of-congestion.

3. The system of claim 2, wherein the data gathering element is communicatively coupled to the first network element through a second network element.

4. The system of claim 2, wherein the analyzer element is configured to compare the performance information to a reference performance information, to identify the first network element as the point-of-congestion.

5. The system of claim 4, wherein the data gathering element is configured to generate the reference performance information from a first error statistic related to the first network element, the first error statistic collected at a first instance in time, and to generate the performance information from a second error statistic related to the first network element, the second error statistic collected at a second instance in time.

6. The system of claim 4, wherein the fault isolating element further comprises:
   a memory containing the database of data flow paths; and
   a local interface that is communicatively coupled to a link that communicatively couples the fault isolating element to the first network element.

7. The system of claim 6, wherein the database of data flow paths is provisioned using an I/O device that is coupled to the memory through the local interface.

8. The system of claim 7, wherein the fault isolating element is located in a third network element in the plurality of network elements.

9. The system of claim 6, wherein the database of data flow paths is provisioned by accessing information contained in the link that communicatively couples the fault isolating element to the first network element.

10. The system of claim 9, wherein the fault isolating element is located in a third network element in the plurality of network elements.

11. A non-transitory computer-readable medium having a fault isolation system stored thereon, the system comprising:

logic configured to provide a database of data flow paths of a network comprising a plurality of network elements;

logic configured to use the database of data flow paths to generate a list of network elements that are potential points-of-congestion while ignoring single data terminating elements of the plurality of network elements, the single data terminating elements comprising individual single data terminating elements that are connected to a single network element with no other network element in the plurality of network elements connected to it; and logic configured to analyze error information related to at least one network element of the plurality of network elements in the list, and an error threshold value associated with the at least one network element, to identify the at least one network element as a point-of-congestion.

12. The non-transitory computer-readable medium of claim 11, wherein the system further comprises:

logic configured to provide an error threshold value of the network element;

logic configured to generate a current error value of the network element; and logic configured to compare the error threshold value to the current error value and identify the network element in the plurality of network elements as a point-of-congestion.

13. The non-transitory computer-readable medium of claim 12, wherein the logic configured to generate the current error value of the network element comprises logic configured to collect error information related to the network element.

14. A method of fault isolation comprising:

providing a database of data flow paths between a plurality of network elements in a network;

using the database of data flow paths to generate, via at least one network element of the network, a list of network elements that are potential points-of-congestion while ignoring single data terminating elements of the plurality of network elements, the single data terminating elements comprising individual single data terminating elements that are connected to a single network element with no other network element in the plurality of network elements connected to it;

providing an error threshold value related to a network element in the list of network elements;

collecting, via the at least one network element, error information related to the network element; and analyzing, via the at least one network element, the collected error information and the error threshold value to identify the network element as a point-of-congestion.

15. The method of claim 14, further comprising routing data packets through alternative network elements of the network thereby bypassing the network element.

16. The method of claim 14, wherein collecting error information comprises accessing at least a data packet of a stream of data packets transmitted by the network element.

17. The method of claim 16, wherein collecting error information further comprises communicatively coupling to a second network element, wherein the second network element is configured to receive the stream of data packets transmitted by the network element.

18. The method of claim 16, wherein providing the error threshold value comprises accessing at least one data packet of a stream of data packets transmitted by the network element.

19. The method of claim 18, wherein providing the database of data flow paths comprises accessing at least one data packet of a stream of data packets transmitted by another network element of the network.

20. The method of claim 18, wherein providing a database of data flow paths comprises manual provisioning by an operator.

21. The method of claim 16, wherein providing an error threshold value includes determining a probability of the network element that is a potential point-of-congestion becoming the point-of-congestion.

22. A method of fault isolation comprising:

using a data flow path database to generate, via at least one network element of a network, a list of network elements that are potential points-of-congestion while ignoring single data terminating elements of the network, wherein the data flow path database describes data flow paths between a plurality of network elements in the network, and where individual single data terminating elements are connected to a single network element with no other network element in the plurality of network elements connected to it;

iterating, via the at least one network element, through the list to identify which of the potential points-of-congestion are points-of-congestion by:

analyzing error information collected for one network element of the network elements in the list;

generating an error threshold value for the one network element;

analyzing error information collected for network elements in the list that are downstream of and connected to the one network element;

generating a respective error threshold value for each of the network elements in the list that are downstream of and connected to the one network element; and identifying network elements in the list of potential points-of-congestion as points-of-congestion by comparing the collected error information and the error threshold values.

23. The method of claim 22, wherein the generating the error threshold value for the one network element is based on an absolute quantity.

24. The method of claim 22, wherein the generating the error threshold value for the one network element is based on relative performance of the one network element as compared to other ones of the network elements.

25. The method of claim 22, wherein the generating the error threshold value for the one network element is based on a reference error rate determined from historical data.

* * * * *